(12) United States Patent
Peng et al.

(10) Patent No.: US 7,570,430 B1
(45) Date of Patent: Aug. 4, 2009

(54) HEAD UP DISPLAY HAVING A COMBINER WITH WEDGE LENSES

(75) Inventors: Guolin Peng, Cedar Rapids, IA (US); Martin J. Steffensmeier, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 35 days.

(21) Appl. No.: 11/824,713

(22) Filed: Jul. 2, 2007

(51) Int. Cl.
*G02B 27/14* (2006.01)
*G09G 5/00* (2006.01)
(52) U.S. Cl. ............................ 359/631; 359/630; 345/7
(58) Field of Classification Search .................. 345/7; 359/13, 14, 630, 631, 632
See application file for complete search history.

(56) References Cited

U.S. PATENT DOCUMENTS

| | | | |
|---|---|---|---|
| 3,589,796 A * | 6/1971 | Schaefer | 359/631 |
| 4,968,117 A | 11/1990 | Chern et al. | 350/162.24 |
| 5,436,763 A | 7/1995 | Chen et al. | 359/565 |
| 5,907,416 A | 5/1999 | Hegg et al. | 359/14 |
| 6,236,511 B1 | 5/2001 | Brown | 359/634 |
| 6,301,053 B1 * | 10/2001 | Cheesman | 359/632 |
| 6,567,014 B1 | 5/2003 | Hansen et al. | 340/980 |
| 6,618,203 B2 * | 9/2003 | Nakamura et al. | 359/632 |
| 7,095,562 B1 * | 8/2006 | Peng et al. | 359/630 |
| 2007/0183055 A1 * | 8/2007 | Maliah et al. | 359/632 |

* cited by examiner

*Primary Examiner*—David N Spector
(74) *Attorney, Agent, or Firm*—Daniel M. Barbieri

(57) ABSTRACT

A head up display system for a vehicle includes an image source and an optical combiner which reflects the projected image from the image source toward an observer for observation. The optical combiner is positioned so that the observer, in a line of sight, sees both a visual exterior view of an outside scene through the combiner and the projected image in the combiner. In disclosed embodiments, the optical combiner comprises wedge lenses.

16 Claims, 6 Drawing Sheets

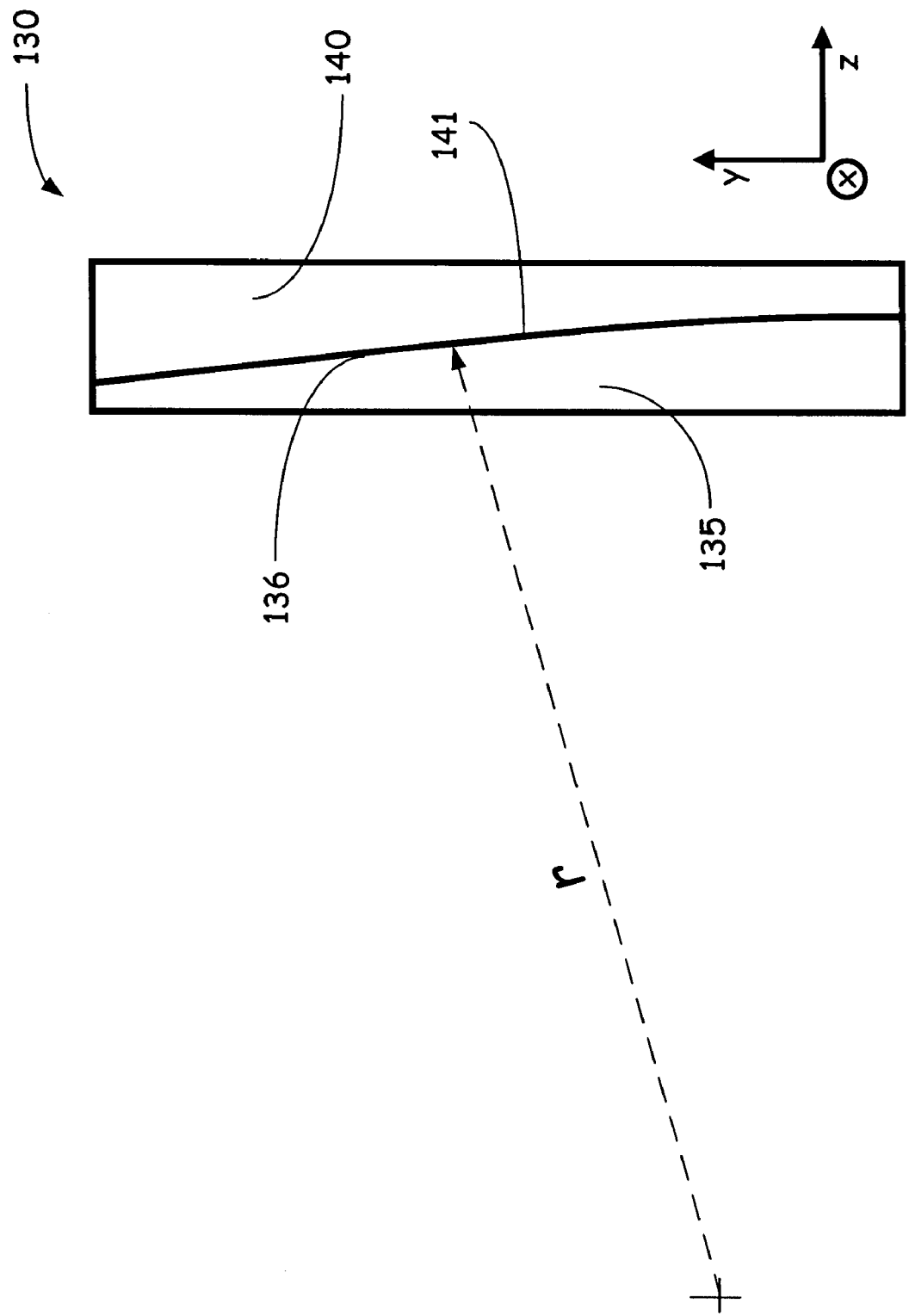

HEAD UP DISPLAY HAVING A COMBINER WITH WEDGE LENSES

BACKGROUND

A Head Up Display (HUD) is a means of projecting information directly into a human's visual field. The HUD was pioneered for military aviation and has since been used in other applications. HUDs are typically used in aircraft to provide pilots with information superimposed onto their forward field of view through the aircraft windshield. The information displayed may be data or symbolic images indicative of flight conditions such as the operating condition of the aircraft, environmental information or guidance information for use in directing the aircraft to its destination. These images are presented in overlying fashion on the pilot's field of view so as not to interfere with the pilot's view of the background scene.

A HUD uses an optical combiner to add computer generated symbols to the pilot's forward field of view. The system is designed to place this added imagery at optical infinity so that the pilot does not need to refocus eyes when switching between threat scanning and reading the HUD data. Although HUDs are useful in a variety of applications, there are several problems with conventional HUDs, among which high cost, narrow viewing angles, mechanical constraints, and low contrast of images are of particular concern. Optical combiners present problems and challenges in HUD design. For example, many conventional combiners are either undesirably thick or heavy for most applications, or are thin and undesirably highly curved. The thick combiners often contain a pair of cooperative lens elements, at least one of which includes an embedded spherical surface coated with a spectrally reflecting thin film. The external surfaces of these thick combiners are flat so as to provide an undistorted view of the background scene. Thin combiners, on the other hand, typically employ a pair of spherical external surfaces, one of which carries the spectrally reflecting thin film. Thin combiners thus typically do not provide the necessary undistorted view of the background scene, especially when the combiner is thick enough to be adequately durable.

The combiner of the HUD is a critical component to provide a collimated display image to a pilot for a given Field of View (FOV) at a given design reference point. As noted, the HUD combiner components are generally large in size. The current HUD combiners are typically comprised of two optical components and with reflection holograms or dielectric coatings on some of the surfaces. They are cemented together or co-mounted in the HUD system configuration which induces complicated assembly and high cost to the HUD system.

Often, HUD applications include the use of combiners with a doublet lens. The doublet combiner is composed of a convex front lens and a concave back lens. The convex surface of the convex lens is dichroic or holographically coated for reflecting the HUD format information. Since the optical power of the front lens cancels the optical power of the back lens, there is no optical effect when viewing through the combiner. Current HUD applications use lenses which are symmetrical in both of the x and y axes. The x and y axes in this context are the axes along the width and height of the combiner lenses, while the z axis is the axis along the thickness or depth of the combiner lenses. This kind of combiner requires a complicated relay lens system to compensate for optical aberrations.

The discussion above is merely provided for general background information and is not intended to be used as an aid in determining the scope of the claimed subject matter.

SUMMARY

A head up display system for a vehicle includes an image source and an optical combiner which reflects the projected image from the image source toward an observer for observation. The optical combiner is positioned so that the observer, in a line of sight, sees both a visual exterior view of an outside scene through the combiner and the projected image in the combiner. In disclosed embodiments, the optical combiner comprises wedge lenses.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 3-1 is a side view illustration of an optical combiner using wedge lenses in accordance with some disclosed embodiments.

FIGS. 3-2 is a side view illustration of an optical combiner using wedge lenses in accordance with other disclosed embodiments.

FIG. 4 is a side view illustration of features of the optical combiner shown in FIGS. 3-1 in accordance with some embodiments.

DETAILED DESCRIPTION

Disclosed embodiments utilize a pair of matched wedge lenses as the Head Up Display (HUD) combiner. These wedge lenses provide improved optical performance due to their non-symmetrical nature, allowing the HUD optical system to be greatly simplified.

Figure 1:
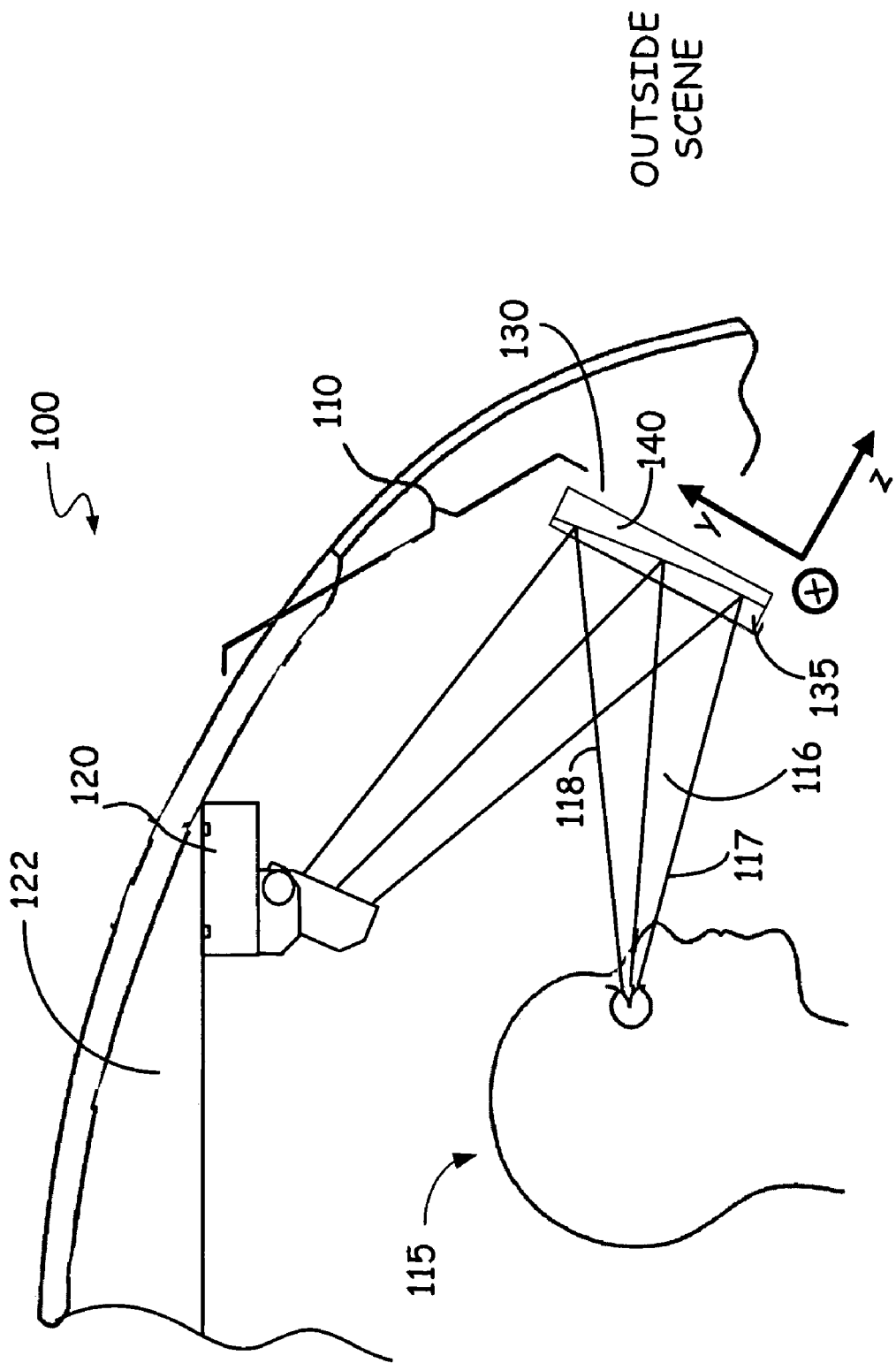
FIG. 1 is an illustration of certain components of a Head UP Display (HUD) in accordance with some disclosed embodiments.

Referring to FIG. 1, shown is an example of a Head Up Display (HUD) 110 in accordance with disclosed embodiments. The HUD 110 is shown positioned in a vehicle 100, for example an aircraft cockpit. Vehicle 100 can also be other vehicle types, such as an automobile, a truck, a tank, etc. HUD 110 can also be used in applications which are not inside a vehicle, and illustration of HUD 110 in vehicle 100 does not limit disclosed embodiments to vehicle use.

HUD 110 includes an image source 120 and an optical combiner 130. Other components, though not necessarily illustrated in FIG. 1, can also be included in HUD 110. Image source 120 projects an image (e.g., words, gauges or other symbols and information) toward combiner 130. The image source 120 can be any of a wide variety of image sources. For example, the image source 120 can be a transmissive liquid crystal display (LCD), a reflective LCD, a digital micromirror device, a laser display, a light emitting diode (LED) display, a plasma display, a cathode ray tube (CRT) display, or the like. In one particular example, image source 120 may be a flat panel LCD.

The HUD combiner 130 can be positioned so that observer 115, in a field of view 116 defined between lines of sight 117 and 118 in FIG. 1, may see a visual exterior view of an outside scene through the HUD beam combiner 130 and the projected image in the HUD beam combiner. Thus, HUD 110 provides some convenience to the observer 115 (e.g., a pilot, a co-pilot, a vehicle driver or other persons) allowing the viewing of both the projected image and the outside scene without any, or substantial, head movement. Image source 120 can be located at any angle relative to the line of sight of the observer 115. For example, image source 120 can be located above or below the line of sight of the observer. This allows flexibility in terms of relative positions between combiner 130 and image source 120 to be provided, thereby leading to convenience in placing HUD 110 in a crowded place (e.g., an airplane cockpit, a combat tank, a vehicle, or the like). In the example embodiment provided in FIG. 1, image source 120 is positioned adjacent a ceiling 122 of vehicle 100, which can be the ceiling of a cockpit for example.

In accordance with disclosed embodiments, combiner 130 comprises a pair of wedge lenses 135 and 140 which are non-symmetrical in at least one of the x and y axes. The x, y and z axes are illustrated in FIG. 1, demonstrating respectively the width, height, and thickness (or depth) directions which define the shape of these lenses. Conventional optical combiners have comprised a pair of matched lenses, each of which is symmetrical in both of the x and y axes. For example, the doublet combiners described above are composed of a pair of symmetrical lenses having a convex front lens and a concave back lens. The doublet type optical combiners require a complicated relay lens system to compensate for optical aberrations. The wedge lens optical combiner 130 of disclosed embodiments eliminates the need for such complicated relay lens systems, or allows simpler and less expensive relay lens systems to be used.

Figure 2:
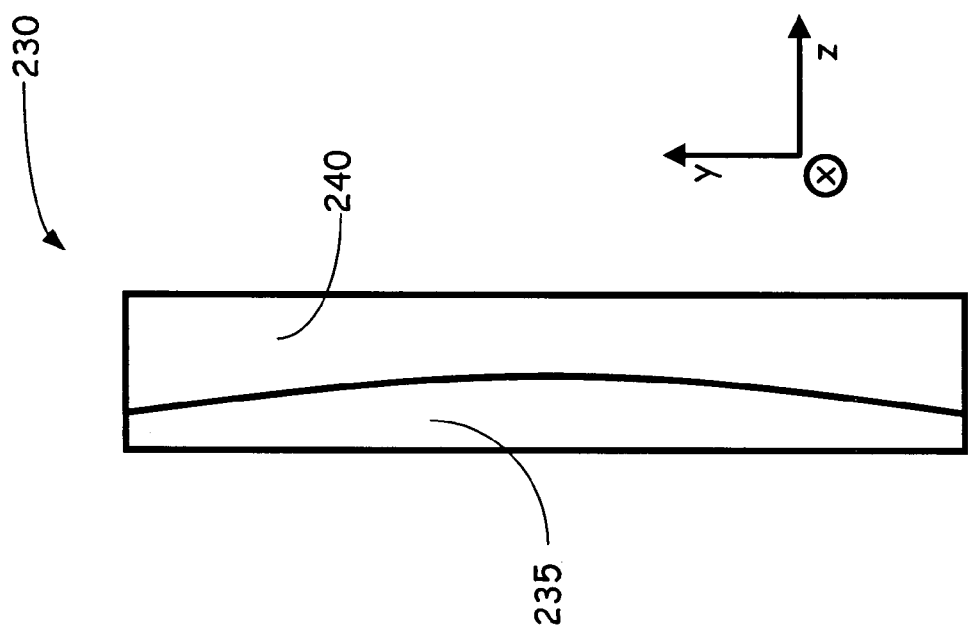
FIG. 2 is a side view illustration of a prior art optical combiner used in some conventional HUDs.

Referring now to FIG. 2, shown is a prior art doublet optical combiner 230 comprised of a pair of matched lenses 235 and 240. Front lens 235 and back lens 240 provide convex and concave matched surfaces, respectively, which are glued together using an optical cement. Lenses 235 and 240, while not symmetrical in the illustrated z axis (thickness) direction, are each symmetrical in both of the x (width) and y (height) directions. As discussed above, use of this type of conventional combiner lenses requires the use of a complicated relay lens system to compensate for optical aberrations.

Figures 2, 3:
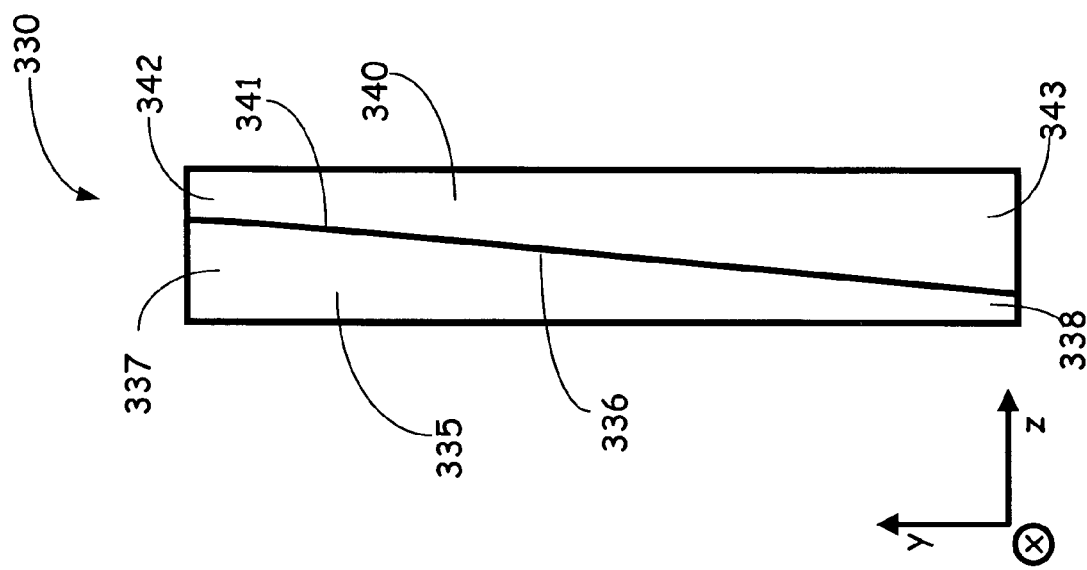
Figures 1, 3:
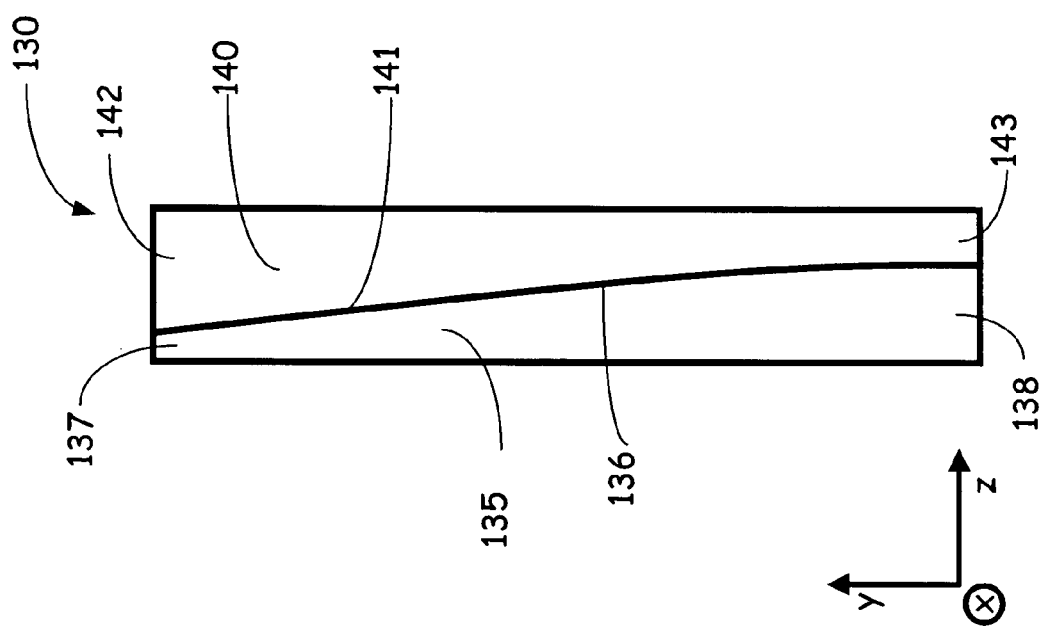

Referring now to FIGS. 3-1, shown is optical combiner 130 from FIG. 1 in greater detail. As can be seen in FIGS. 3-1, optical combiner 130 includes front wedge lens 135 and rear wedge lens 140. Front wedge lens 135, in this example embodiment, is the lens positioned closest to observer 115 and image source 120. Rear wedge lens 140 is positioned behind front wedge lens 135. As can be seen in FIGS. 3-1, front wedge lens 135 is thicker at the bottom 138 and thinner at the top 137, while rear wedge lens 140 is thinner at the bottom 143 and thicker at the top 142. Thus, wedge lenses 135 and 140 each provide a respective matched surface 136 or 141 which can be cemented or otherwise secured together. Surface 136 includes an optical thin film to reflect the projected image. This thin film 136 is typically in contact with an optical cement, which is not shown in FIGS. 3-1 in order to simplify the illustration.

Referring now to FIGS. 3-2, shown is another example embodiment of an optical combiner 330 which can be used as, or in place of, optical combiner 130 in FIG. 1. Optical combiner 330 has wedge lenses 335 and 340 which are similar to wedge lenses 135 and 140. However, as shown in FIGS. 3-2, front wedge lens 335 is thinner at the bottom 338 and thicker at the top 337, while rear wedge lens 340 is thinner at the top 342 and thicker at the bottom 343. Wedge lenses 335 and 340 each provide a respective matched surface 336 or 341 which can be cemented or otherwise secured together. In this embodiment, surface 336 includes an optical film to reflect the projected image.

Referring now to FIG. 4, shown are additional features of optical combiner 130 in accordance with some embodiments. As illustrated in FIG. 4, front wedge lens 135 of optical combiner 130 has a radius of curvature "r" at surface 136. In exemplary embodiments, a radius of curvature r of between 20 inches and 40 inches has been found to provide good performance. In order for surface 141 to conform to the shape of surface 136, surface 141 must have a similar radius of curvature. It is important to note that the curvature of surfaces 136 and 141 need not be constant, and can be limited to portions or segments of these surfaces.

Figure 5:
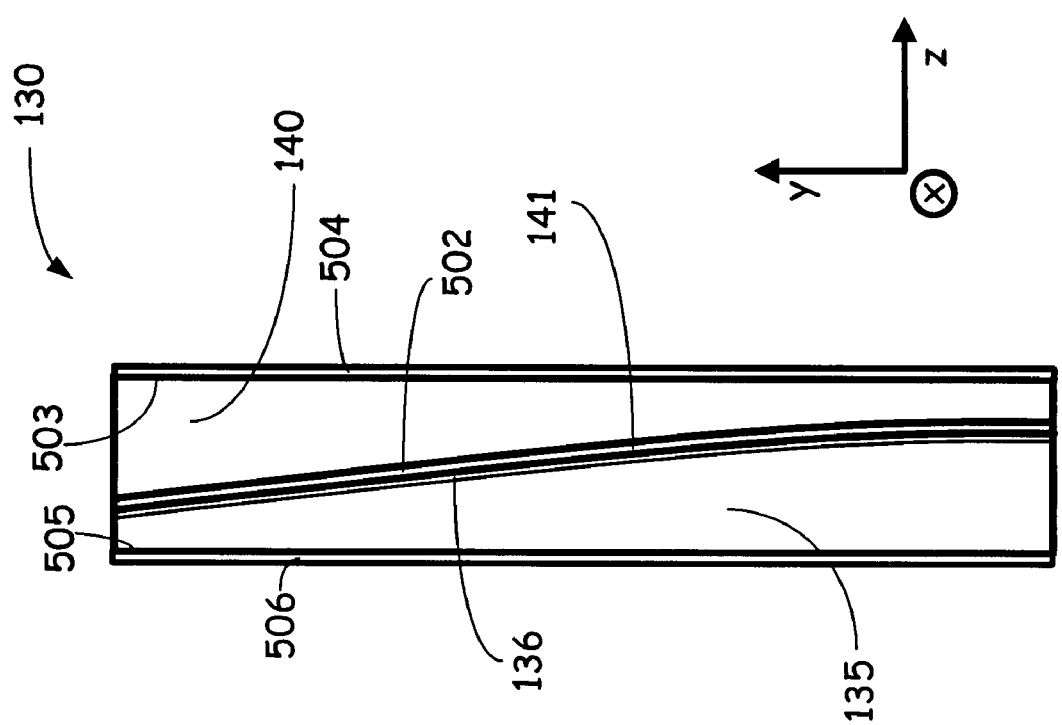
FIG. 5 is a side view illustration of other features of the optical combiner shown in FIGS. 3-1 in accordance with some embodiments.

Referring now to FIG. 5, shown are additional features of optical combiner 130 in accordance with some embodiments. As illustrated in FIG. 5, a layer of optical cement 502 is used to attach wedge lenses 135 and 140 between the surface provided by optically reflective film 136 and surface 141 of lens 140 (or of other optical films positioned between lenses 135 and 140). Also shown in FIG. 5, back surface 503 of wedge rear wedge lens 140 has an anti-reflective coating 504 positioned thereon. Similarly, front surface 505 of front wedge lens 135 has an anti-reflective coating 506. Anti-reflective coatings 504 and 506 are only one example of optical coatings which can be positioned on one or both of lenses 135 and 140, and these coatings can be in the form deposits, films, and/or optical materials placed using any other suitable technique.

As described, the wedge lens optical combiners used in disclosed embodiments allow simplification of the HUD optical system. Because wedge lenses represent a de-center of the symmetrical conventional lens, these combiners more easily compensate for aberrations induced by tilting, de-center and tiling.

Figure 6:
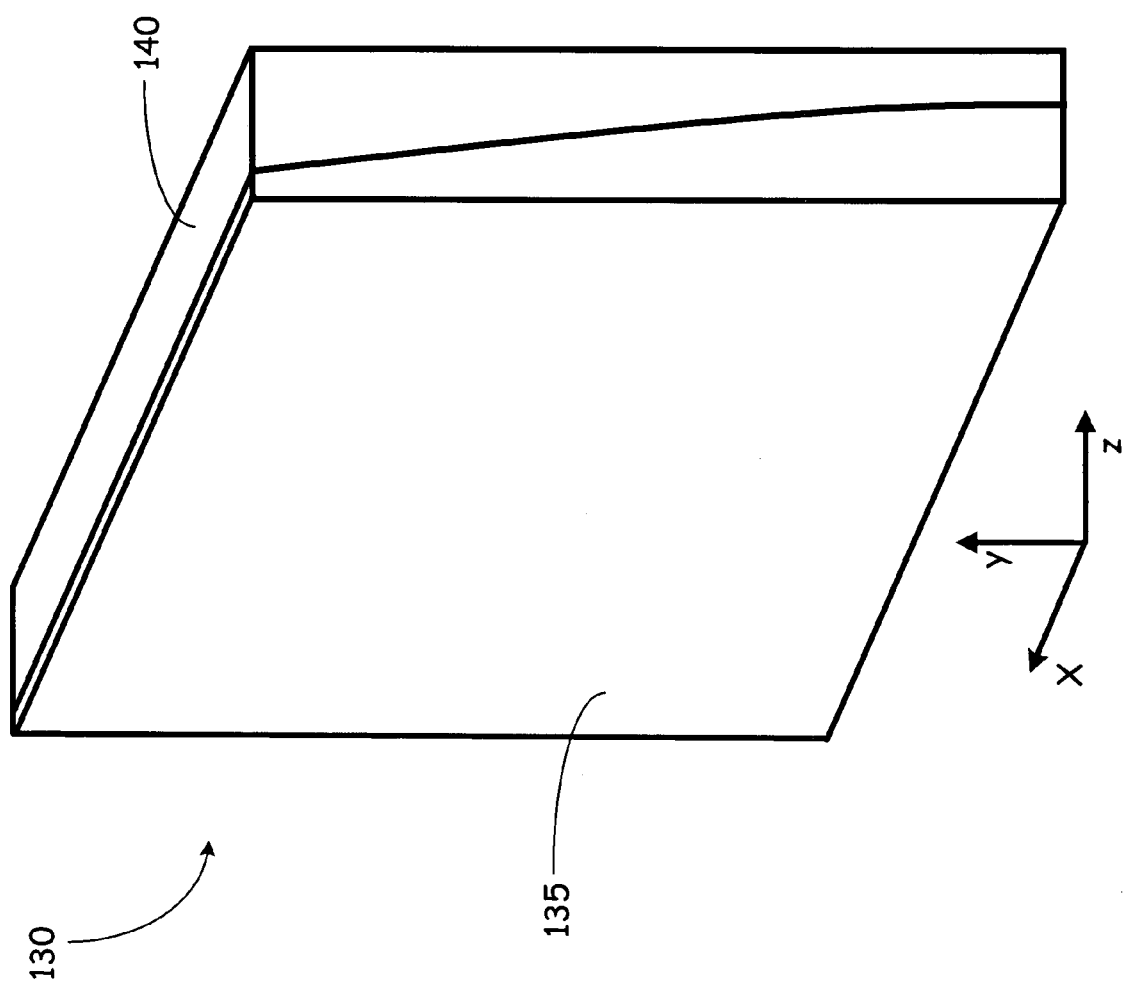
FIG. 6 is a perspective view illustration of an optical combiner using wedge lenses in accordance with some disclosed embodiments and illustrating width, height and thickness dimensions.

In summary provided using example embodiments which do not limit the scope of the claims appended hereto, a HUD or HUD system is disclosed which includes an image source 120 and an optical combiner 130 or 330 which is configured to reflect a projected image from the image source toward an observer 115 for observation. The optical combiner is positioned so that the observer, in a line of sight, sees both a visual exterior view of an outside scene through the combiner and the projected image in the combiner. In disclosed example embodiments, the optical combiner comprises wedge lenses, for example a pair of wedge lenses 135/140 or 335/340. The pair of wedge lenses extend in width (x), height (y) and thickness (z) directions. The width and height directions are directions in which the optical combiner has dimensions greater than its dimensions in the thickness direction. To further illustrate this point, FIG. 6 shows a perspective view of optical combiner 130 in order to demonstrate these three directions. Optically reflective film 136 and optical cement 502 are not shown in FIG. 6 in order to simplify the illustration. In disclosed embodiments, improvements are achieved due to the fact that the pair of wedge lenses are non-symmetrical in at least one of the width and height directions, as compared to conventional optical combiners which are parallel in both of the width and height directions.

In disclosed embodiments, the pair of wedge lenses include a front wedge lens and a rear wedge lens, with the front wedge lens being identified by its positioning closer to the image source and the viewer than the rear wedge lens. In first embodiments such as the one illustrated in FIGS. 3-1, the front wedge lens 135 has a bottom end 138 and a top end 137, with the top end of the front wedge lens being positioned closer to the image source than the bottom end of the front wedge lens. In this embodiment, the front wedge lens 135 is thicker at its bottom end 138 than at its top end 137. Also in this embodiment, the rear wedge lens 140 has a bottom end 143 and a top end 142, with the top end of the rear wedge lens being positioned closer to the image source than the bottom end of the rear wedge lens. In this embodiment, the rear wedge lens 140 is thicker at its the top end than at its bottom end. In other embodiments, such as the one illustrated in FIGS. 3-2, the front wedge lens 335 is thicker at its top end 337 than at its bottom end 338, while the rear wedge lens 340 is thicker at its bottom end 343 than at its top end 342.

As illustrated in FIG. 4, in some disclosed embodiments, at least one of the front wedge lens and the rear wedge lens provides a surface 136/141 having a radius of curvature "r" of between twenty inches and forty inches.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A head up display system for a vehicle, the head up display system comprising:
   an image source configured to project an image; and
   an optical combiner configured to reflect the projected image toward an observer for observation, the optical combiner being positioned so that the observer, in a line of sight, sees both a visual exterior view of an outside scene through the combiner and the projected image in the combiner, wherein the optical combiner comprises a pair of wedge lenses, the pair of wedge lenses having overall width, height and thickness dimensions in width, height and thickness directions, wherein the width and height dimensions are greater than the thickness dimension, and wherein the pair of wedge lenses of the optical combiner comprises a front wedge lens and a rear wedge lens, the front wedge lens being positioned closer to the image source than the rear wedge lens.

2. The head up display system of claim 1, wherein the pair of wedge lenses are non-symmetrical in at least one of the width and height directions.

3. The head up display of claim 1, wherein the front wedge lens has a bottom end and a top end, the top end of the front wedge lens being positioned closer to the image source than the bottom end of the front wedge lens, wherein the front wedge lens is thicker at its bottom end than at its top end.

4. The head up display system of claim 3, wherein the rear wedge lens has a bottom end and a top end, the top end of the rear wedge lens being positioned closer to the image source than the bottom end of the rear wedge lens, wherein the rear wedge lens is thicker at its the top end than at its bottom end.

5. The head up display of claim 1, wherein the front wedge lens has a bottom end and a top end, the top end of the front wedge lens being positioned closer to the image source than the bottom end of the front wedge lens, wherein the front wedge lens is thicker at its top end than at its bottom end.

6. The head up display system of claim 5, wherein the rear wedge lens has a bottom end and a top end, the top end of the rear wedge lens being positioned closer to the image source than the bottom end of the rear wedge lens, wherein the rear wedge lens is thicker at its the bottom end than at its top end.

7. The head up display of claim 1, wherein at least one of the front wedge lens and the rear wedge lens provides a surface having a radius of curvature of between twenty inches and forty inches.

8. The head up display system of claim 7, wherein the image source is positioned above the optical combiner and adjacent a ceiling of the vehicle.

9. A head up display for a vehicle, the head up display comprising:
   an image source configured to project an image; and
   an optical combiner configured to reflect the projected image toward an observer for observation, the optical combiner being positioned so that the observer, in a line of sight, sees both a visual exterior view of an outside scene through the combiner and the projected image in the combiner, wherein the optical combiner comprises wedge lenses which extend in width, height and thickness directions, and wherein the wedge lenses are non-symmetrical in at least one of the width and height directions, the wedge lenses have overall width height and thickness dimensions in the width, height and thickness directions, wherein the width and height dimensions are greater than the thickness dimension, and wherein wedge lenses of the optical combiner comprise a front wedge lens and a rear wedge lens, the front wedge lens being positioned closer to the image source than the rear wedge lens.

10. The head up display of claim 9, wherein the front wedge lens has a bottom end and a top end, the top end of the front wedge lens being positioned closer to the image source than the bottom end of the front wedge lens, wherein the front wedge lens is thicker at its bottom end than at its top end.

11. The head up display of claim 10, wherein the rear wedge lens has a bottom end and a top end, the top end of the rear wedge lens being positioned closer to the image source than the bottom end of the rear wedge lens, wherein the rear wedge lens is thicker at its the top end than at its bottom end.

12. The head up display of claim 9, wherein the front wedge lens has a bottom end and a top end, the top end of the front wedge lens being positioned closer to the image source than the bottom end of the front wedge lens, wherein the front wedge lens is thicker at its top end than at its bottom end.

13. The head up display of claim 12, wherein the rear wedge lens has a bottom end and a top end, the top end of the rear wedge lens being positioned closer to the image source than the bottom end of the rear wedge lens, wherein the rear wedge lens is thicker at its the bottom end than at its top end.

14. The head up display of claim 9, wherein at least one of the wedge lenses has a surface having a radius of curvature of between twenty inches and forty inches.

15. The head up display of claim 14, wherein the image source is positioned above the optical combiner and adjacent a ceiling of the vehicle.

16. The head up display of claim 15, wherein the image source is positioned adjacent a ceiling of a cockpit of an aircraft.

* * * * *